United States Patent [19]

Lynn

[11] 4,442,570
[45] Apr. 17, 1984

[54] STUFFED SHRIMP PREPARATION TOOL

[75] Inventor: Alan W. Lynn, 2 Murphy's La., Shelton, Conn. 06484

[73] Assignee: Alan W. Lynn, Shelton, Conn.

[21] Appl. No.: 414,613

[22] Filed: Sep. 3, 1982

[51] Int. Cl.³ .............................................. A22C 29/02
[52] U.S. Cl. .......................................... 17/73; 30/314
[58] Field of Search ................... 17/71, 72, 73, 66, 69; 30/314

[56] References Cited

U.S. PATENT DOCUMENTS

| 229,659 | 12/1973 | Murnan . | |
|---|---|---|---|
| 256,317 | 8/1980 | Marquart, Sr. . | |
| 717,408 | 12/1902 | Jacobsen | 17/69 |
| 2,541,781 | 2/1951 | Riha | 17/72 X |
| 2,594,205 | 4/1952 | Paoli . | |
| 2,707,325 | 5/1955 | Cripps . | |
| 2,840,851 | 7/1958 | Verlander | 17/69 |
| 2,876,487 | 3/1959 | Pasquale | 17/72 X |
| 4,283,854 | 8/1981 | Austin | 30/314 |

FOREIGN PATENT DOCUMENTS 57094  6/1891  Fed. Rep. of Germany .......... 17/69

Primary Examiner—Willie G. Abercrombie
Attorney, Agent, or Firm—William A. Simons

[57] ABSTRACT

Disclosed is a tool particularly adapted for removing the legs and bottom part of a shell of a shrimp and for cutting the meat of the partially deshelled shrimp before placing stuffing into the shrimp.

6 Claims, 5 Drawing Figures

U.S. Patent  Apr. 17, 1984  4,442,570
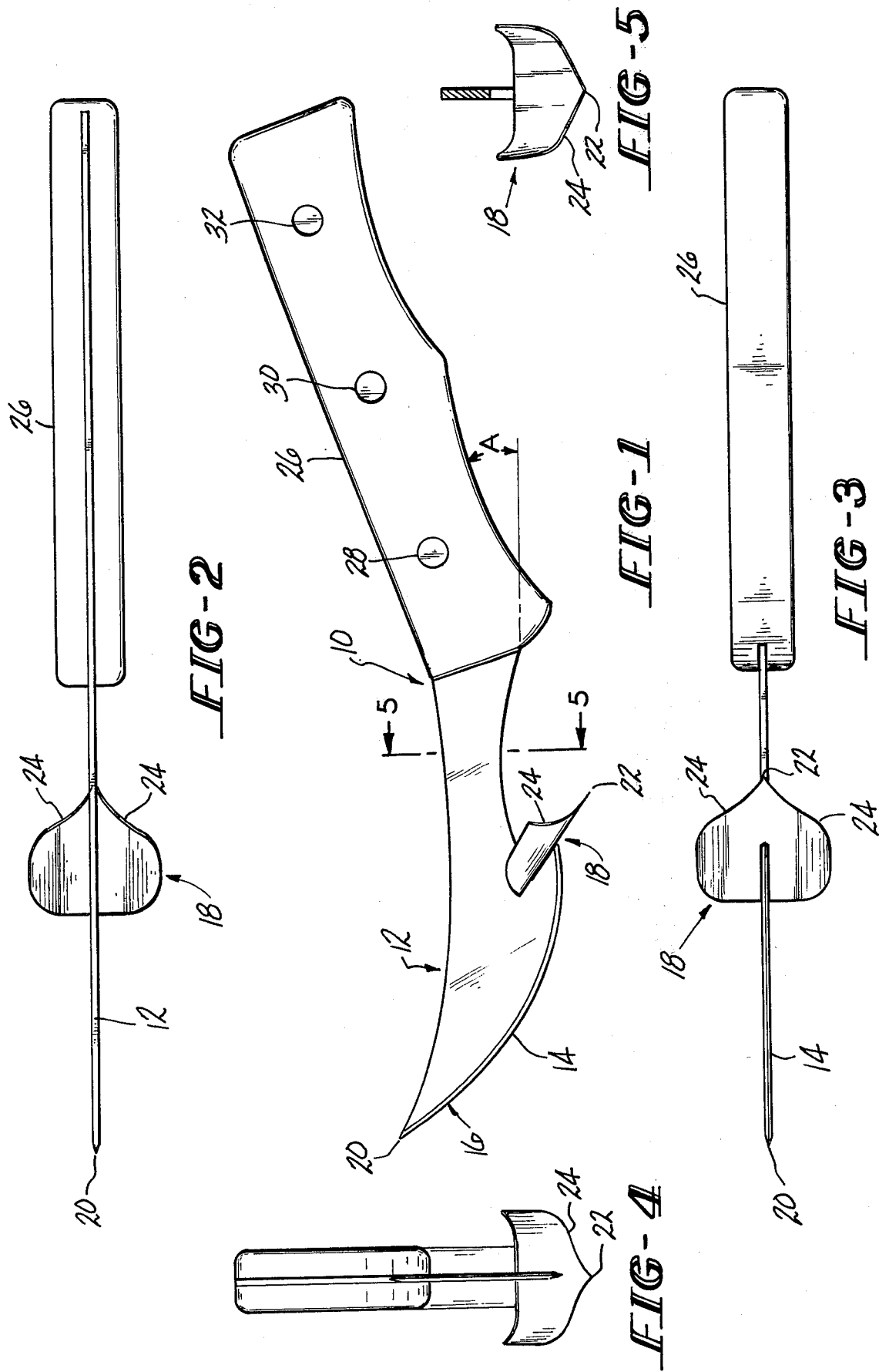

STUFFED SHRIMP PREPARATION TOOL

BACKGROUND OF THE INVENTION

1. Field of the Invention

The present invention relates to a tool particularly adapted for removing the legs and bottom or belly part of a shell of a shrimp and for cutting the meat of the partially deshelled shrimp before placing stuffing into the shrimp.

2. Description of the Prior Art

Stuffed shrimp is a foodstuff served today in many restaurants. The term "stuffed shrimp" as used herein includes any cooked shrimp or prawn with some sort of stuffing added. In typical practice, each stuffed shrimp is made up of a partly deshelled or totally deshelled shrimp or prawn which has either crabmeat, breadcrumbs or other conventional stuffing material placed inside a cut along the bottom of the shrimp. After the shrimp has been stuffed, it is baked in an oven for about 15 to 20 minutes or deep fried until cooked.

The shrimp are commonly prepared for stuffing today by manually removing the legs and bottom or belly part of the shrimp's shell. Specifically, this may be done by holding the shrimp upside down in one hand and drawing a finger of the other hand towards the preparer underneath the bottom portion of the shell, thereby ripping out the legs and bottom part of the shrimp's shell. After that step and while the shrimp is still held upside down in the one hand, a cut is made with a knife along most of the length of the shrimp's bottom. This cut is then filled with stuffing.

However, there are several problems associated with this ripping of the legs and bottom portion of the shrimp's shell by hand. First, the fingers may be cut on the hard shell of the shrimp while peeling the belly. Second, this method is relatively slow. Only one or two shrimp may be normally processed per minute because the knife has to be picked up after the ripping step and before the cutting step. Third, the preparer has to touch the meat of the shrimp extensively by this method. And, if the preparer's fingers are cut by the shell of the shrimp, this method may be unsanitary. Fourth, the preparer must handle a knife with a hand and fingers which may become slippery by touching the shell of the shrimp. This may lead to unsafe use of the knife during the cutting step.

The present invention offers a tool which allows the preparation of stuffed shrimp without these problems. Specifically, this tool replaces the use of fingers to rip out the legs and bottom portion. Further, there is a significant reduction in processing time by use of this tool. Thus, making it more economical for a restaurant to make and serve stuffed shrimp. Still, the processing is made more sanitary and safer by use of this tool.

BRIEF SUMMARY OF THE INVENTION

The present invention, accordingly, is directed to a tool particularly adapted for removing the legs and bottom part of a shell of a shrimp and for cutting the meat of said partially deshelled shrimp comprising:
an integral body defining a blade portion and a handle portion;
said blade portion having two opposite sides with one side having both a continuous cutting edge portion and a cup-shaped portion, said cup-shaped portion positioned between said cutting edge portion and said handle portion and reversely facing said handle portion;
said cup-shaped portion having
(a) a point at the outer end of said cup-shaped portion adapted to hook under the bottom part of the shell of a shrimp when in use; and
(b) edges on each side of said cup-shaped portion to catch the legs of said shrimp when in use; and
said handle portion adapted to be held in a user's hand during said shell-removing and meat-cutting steps.

BRIEF DESCRIPTION OF THE DRAWINGS

FIG. 1 is a side elevation view of a preferred embodiment of the tool of the present invention.

FIG. 2 is a top view of this same preferred embodiment.

FIG. 3 is a bottom view of this same preferred embodiment.

FIG. 4 is a front view of this same preferred embodiment.

FIG. 5 is a sectional view along lines 5—5 of FIG. 1.

DETAILED DESCRIPTION

As stated above, the body of the tool of the present invention has a blade portion and a handle portion. Preferably, the blade portion is formed of metallic material such as stainless steel and the like. The body of the tool, however, may be made from other materials that have sufficient hardness to do the job intended. Preferably, the handle portion is either totally metallic material such as stainless steel and the like or such metallic materials covered with wooden material such as beechwood or the like. More preferably, the metallic materials of the blade and handle portions may be made of an integral piece of metal. Alternatively, the body of this tool may be made of a hard plastic. Metal is preferred over plastic because it may be resharpened; although plastic may be desired if a disposable tool is wanted.

Referring more specifically to the Drawings, there is illustrated a tool 10 which embodies the features of the present invention. The tool 10 comprises a relatively thin integral body, fabricated from a suitable metallic material such as stainless steel or carbon steel or the like, and which comprises a blade portion which is positioned to the left of the line 5—5 in FIG. 1 and a handle portion which is positioned to the right of line 5—5 in FIG. 1. Preferably, the blade portion and the handle portion are substantially balanced for proper use.

The blade portion includes opposite sides 12 and 14 which defines a widthwise direction therebetween. The side 14 has both a continuous cutting edge portion 16 and a cup-shaped portion 18. The cup-shaped portion 18 is reversely facing said handle portion. Preferably, opposite sides 12 and 14 of the blade portion meet at point 20 farthest away from said handle portion and said point 20 forms one end of the continuous cutting edge portion 16. More preferably, opposite side 12 is relatively straight and side 14 is curved upwards towards side 12 until they meet at point 20. The curvature of side 14 should approximate the natural curvature of a shrimp for ease of handling. Alternatively (and not shwon in the Drawings), sides 12 and 14 may be relatively parallel to each other and end in a rounded fashion or at a flat end rather than a point. The continuous cutting edge portion 16 is particularly adapted for cutting the bottom of a deshelled shrimp lengthwise.

The cup-shaped portion 18 is positioned between the continuous cutting edge portion 16 and the handle portion. The cup-shaped portion 18 comprises a point 22 at the outer end of said cup-shaped portion 18 and edges 24 on each side of said cup-shaped portion 18. Point 22 is adapted to hook under the bottom part of the shell of a shrimp when in use. Edges 24 catch the legs of the shrimp when in use besides peeling the shell. Therefore, a bowl-like space or compression is created by the reverse-facing surfaces of said cup-shaped portion 18. This bowl-like space allows the shrimp legs and bottom part to accumulate therein after being peeled off and not interfere with the peeling process. The angle at which point 22 is projected from a vertical plane is not critical. The cup-shaped portion is normally made of a thin piece of steel (stainless is preferred) shaped by curving the outer edges in (to face the handle in use). This shaped thin piece of steel is then attached to the rest of the blade portion by any suitable means (e.g. welding or brazing).

The handle portion is adapted to be held in a user's hand when the palm of such hand is closed about the handle portion. As stated above, it may be either totally metal or metal covered with wood or plastic. The Drawings show a preferred embodiment where said handle portion is made up of an inner metallic portion which is covered completely with an outer wood portion 26 and is rectangular in shape. The outer wood portion 26 is attached to the inner metal portion by means of fasteners 28, 30 and 32. More preferably, handle portion is on an angle (shown as A in FIG. 1) from about 10° to 60° away from the side of said blade portion having continuous cutting edge portion 16 and cup-shaped portion 18. This will facilitate both the peeling and cutting steps without user's hand getting in the way.

To use, a shrimp or prawn is held in one hand upside down (bottom part and legs up) with the tail pointed away from the user. The size of the shrimp may vary from those very large jumbo shrimp of about 6 to 8 per pound to medium or small size shrimp of about 20 to 25 per pound. The tool of the present invention is held in the other hand. Th point 22 of the cup-shaped portion 18 is placed between the tail section and the first section of the bottom part of the shrimp. The tool is then drawn straight down the middle toward the user along the length of the shrimp. The point 22 and edges 24 peel the belly shell as the tool is drawn toward the user. The edges 24 also catch the legs of the shrimp as the tool is drawn toward the user and rips them from the shrimp. The removed legs and bottom part of the shrimp are directed away from all cutting edges by the bowl-like compression formed by the cup-shaped portion 18. As the tool is drawn towards the user, the continuous cutting edge 16 also begins to cut into bottom meat of the delegged and partially deshelled shrimp and forms a lengthwise cut where stuffing may be placed. In other words, one draw will make both peeling and cutting operations. At the end of the draw, the peeled bottom part and the legs may be easily removed from the bowl-like space by pointing the tool upwards and flicking the wrist. The shrimp is now ready to be stuffed and cooked. Alternatively, the rest of the shell may be also removed now and other popular shrimp dishes like butterfly shrimp or shrimp scampi may be instead made.

What is claimed is:

1. A tool particularly adapted for removing the legs and bottom part of a shell of a shrimp or prawn and for cutting the meat of said partially deshelled shrimp comprising:

an integral body defining a blade portion and a handle portion;

said blade portion having two opposite sides with one side having both a continuous cutting edge portion and a cup-shaped portion, said cup-shaped portion positioned between said cutting edge portion and said handle portion and reversely facing said handle portion;

said two opposite sides of said blade portion meet at a point away from said handle portion and said point forms one end of said continuous cutting edge portion and said continuous cutting edge portion is continuously curved upward from said cup shaped portion toward said other opposite side of the blade portion;

said cup-shaped portion having
   (a) a point at the outer end of said cup-shaped portion adapted to hook under the bottom part of the shell of a shrimp when in use; and
   (b) edges on each side of said cup-shaped portion to catch the legs of said shrimp when in use;

said handle portion adapted to be held in a user's hand during said shell removing and meat-cutting steps, and said continuous cutting edge and said cup-shaped portion adapted to make both cutting and leg-removing operations on the bottom of a shrimp in one draw.

2. The tool of claim 1 wherein said blade portion is made from a metallic material.

3. The tool of claim 2 wherein said metallic material is steel.

4. The tool of claim 1 wherein said handle portion is made up of an inner metallic portion which is a continuous extension of the same metal used for said blade portion and an outer wood portion and has a rectangular shape.

5. The tool of claim 1 wherein said handle portion is on an angle from about 10° to about 60° away from the side of said blade portion having said continuous cutting edge portion and said cup-shaped portion.

6. The tool of claim 1 wherein said body of the tool is made entirely of hard plastic.

\* \* \* \* \*